United States Patent [19]
Ungerecht et al.

[11] Patent Number: 5,875,815
[45] Date of Patent: Mar. 2, 1999

[54] COMBINATION PRESSURE REGULATOR/ DRAIN CHECK VALVE

[75] Inventors: Cliff P. Ungerecht; George Sesser, both of Walla Walla, Wash.

[73] Assignee: Nelson Irrigation Corporation, Walla Walla, Wash.

[21] Appl. No.: 954,162

[22] Filed: Oct. 20, 1997

[51] Int. Cl.$^6$ .................................................. G05D 16/02
[52] U.S. Cl. .................... 137/505.25; 137/508; 137/510; 137/614.14
[58] Field of Search ......................... 137/614.14, 505.25, 137/508, 509, 510

[56] References Cited

U.S. PATENT DOCUMENTS

| | | | |
|---|---|---|---|
| 2,833,304 | 5/1958 | Fish ................................. | 137/614.14 X |
| 3,067,770 | 12/1962 | Fancher . | |
| 3,627,977 | 12/1971 | Riley et al. . | |
| 3,848,631 | 11/1974 | Fallon ................................ | 137/505.25 |
| 3,874,404 | 4/1975 | Waight et al. . | |
| 3,890,999 | 6/1975 | Moskow . | |
| 3,981,327 | 9/1976 | Sato ................................ | 137/505.25 X |
| 3,995,656 | 12/1976 | Mills ................................. | 137/505.25 |
| 4,300,592 | 11/1981 | Hartley ............................. | 137/505.25 |
| 4,370,102 | 1/1983 | Sasaki et al. . | |
| 4,467,828 | 8/1984 | Gneiding ........................... | 137/505.25 |
| 4,481,969 | 11/1984 | Fallon ............................... | 137/505.25 |
| 4,516,600 | 5/1985 | Sturman et al. . | |
| 4,543,985 | 10/1985 | Healy ................................ | 137/505.25 |
| 4,561,465 | 12/1985 | Rogers ........................... | 137/505.25 X |
| 4,655,248 | 4/1987 | Chalaire . | |
| 4,673,000 | 6/1987 | Haerr et al. . | |
| 5,213,132 | 5/1993 | Comment .......................... | 137/505.25 |
| 5,257,646 | 11/1993 | Meyer ............................... | 137/505.25 |
| 5,396,918 | 3/1995 | Parker .................................... | 137/508 |
| 5,476,376 | 12/1995 | Santhouse ......................... | 137/505.25 |
| 5,775,370 | 7/1998 | Kaneko et al. .................... | 137/505.25 |

OTHER PUBLICATIONS

Nelson Irrigation Corporation brochure, Drain Check Valve (May, 1995).

Rain Bird brochure, Pop–up Spray Sprinklers 1800 Series, undated.

*Primary Examiner*—Stephen M. Hepperle
*Assistant Examiner*—Ramyar Farid
*Attorney, Agent, or Firm*—Nixon & Vanderhye P.C.

[57] ABSTRACT

A combination pressure regulator/drain check valve comprising a housing having an inlet, an outlet and a flowpath therebetween, the flowpath at least partially defined by a reciprocable plunger. One end of the plunger closest the inlet approaches a pressure regulator seat while the opposite end closest the outlet is engageable with a drain check valve seat. The plunger is normally biased toward the drain check seat.

8 Claims, 8 Drawing Sheets

COMBINATION PRESSURE REGULATOR/ DRAIN CHECK VALVE

TECHNICAL FIELD

This invention relates to pressure regulators designed particularly for use in agricultural irrigation systems.

BACKGROUND OF THE INVENTION

It is well known to use fluid pressure regulators in irrigation systems in order to provide constant outlet pressure over a wide range of inlet pressures. The need for such regulators is particularly acute in low pressure systems because a slight variation in pressure along the system operating at low pressure causes a much greater variation in discharge than the same system operating at high pressure.

The assignee of this invention currently manufactures and sells fluid pressure regulators of the flow through type, having an inlet at one end of a tubular housing and an outlet at the other end of the tubular housing. A plunger seat is secured within the housing and is adapted to be engaged by a lower end of a tubular plunger assembly which is spring biased away from the seat (in the direction of fluid flow) so that under low pressure conditions, maximum flow through the regulator is permitted. In the event of excess pressure, the plunger is moved back by pressure within the diaphragm chamber (above the diaphragm) against the action of the spring (and against atmospheric pressure), toward the regulator seat to thereby throttle the flow through the regulator until the pressure is reduced to the desired level. One such regulator is described in commonly owned U.S. Pat. No. 5,257,646. Other examples are described in U.S. Pat. Nos. 4,543,985 and 3,890,999.

It is also known to use drain check valves in agricultural irrigation and many other liquid and gas flow systems. See, for example, U.S. Pat. Nos. 4,655,248; 3,874,404; and 4,674,000. A combination check and pressure relief valve is described in U.S. Pat. No. 3,626,977. These valves are usually installed just upstream of respective sprinklers and prevent water from draining out of the sprinklers upon shutdown. In the case of sprinklers installed on a sloping field without drain check valves, all of the water in the lines downstream of the shut-off valve will drain out through the sprinklers at the low end of the field, often flooding that area. The drain check valve is designed to close at some preset pressure that is greater than what would be developed in the line due to elevation. For example, if a line of sprinklers has 32 feet of elevation difference between the head of the line and the tail end of the line, in order to keep the water from draining out of the line, the drain check valve would need to close at 32 feet×0.433 p.s.i./ft.=14 p.s.i. There are several drain check valves of this type on the market today, and a typical example of this device is that sold by the assignee of this invention under the name Nelson DCV and the Nelson DCVQC.

The disadvantage of such drain check valves is that they create a pressure loss slightly in excess of the pressure they are designed to check. For example, one drain check valve available from Nelson Irrigation Corp. will check 32 feet of elevation, but will also create 17–18 p.s.i. pressure loss when the sprinkler is operating. This means that the system must be overpressurized by 17–18 p.s.i., which translates into a significant increase in pumping costs.

DISCLOSURE OF THE INVENTION

This invention combines a pressure regulator and a drain check valve into one very economical package that is no larger than a standard pressure regulator. In addition, and with respect to one exemplary embodiment disclosed herein, there are no extra parts needed as compared to a standard pressure regulator, unless it is necessary to make the drain check valve seat out of a rubber type of material to improve sealing with low pressure regulators. In the latter case, only one low cost extra part is required, i.e., a press-in-place rubber washer for the poppet valve to seat against, as discussed further herein.

Another advantage of the present invention is that there is very little or no extra pressure loss over what a standard pressure regulator experiences. In addition, in the case of a high pressure regulator, the unit will check a very high amount of elevation.

In the exemplary embodiment, the plunger assembly of an otherwise conventional pressure regulator is modified to incorporate a drain check valve at the upper or downstream end of the plunger assembly, i.e., at the end opposite the lower or pressure regulating end of the plunger assembly which engages the pressure regulating seat. More specifically, the upper end of the pressure regulator housing is modified to include a valve seating surface or, alternatively, modified to include a discrete valve seat, which is designed to receive the valve at the upper end of the plunger assembly. A coil spring which normally biases the plunger assembly in the upward direction, will cause the drain check valve to seal against the valve seat upon loss of pressure following sprinkler shutdown. In addition, the drain check valve feature would tend to restrict flow in the case of a broken riser or a missing sprinkler downstream of the pressure flow regulator. In this first embodiment, the housing includes inlet and outlet sections secured by a plurality of screw fasteners.

In another embodiment of the invention, the drain check valve includes an O-ring incorporated into a diaphragm retainer secured to the top of the plunger assembly, and a cap portion of the valve is formed with an exit bore, one end of which is formed to include a tapered edge, serving as the drain check valve seat, engageable by the O-ring. In this embodiment, the valve housing has a main body portion and a cap threadably secured to the main body portion. Operation of this valve is otherwise similar to the first described embodiment.

Accordingly, in its broader aspects, the present invention relates to a combination pressure regulator/drain check valve comprising a housing having an inlet, an outlet and a flowpath therebetween, the flowpath at least partially defined by a reciprocable plunger assembly engageable at one end thereof closest the inlet with a pressure regulator seat and at another opposite end closest the outlet with a drain check valve seat, the plunger normally biased toward the drain check seat.

Other objects and advantages of the subject invention will become apparent from the detailed description which follows.

DETAILED DESCRIPTION OF THE DRAWINGS

Figure 1:
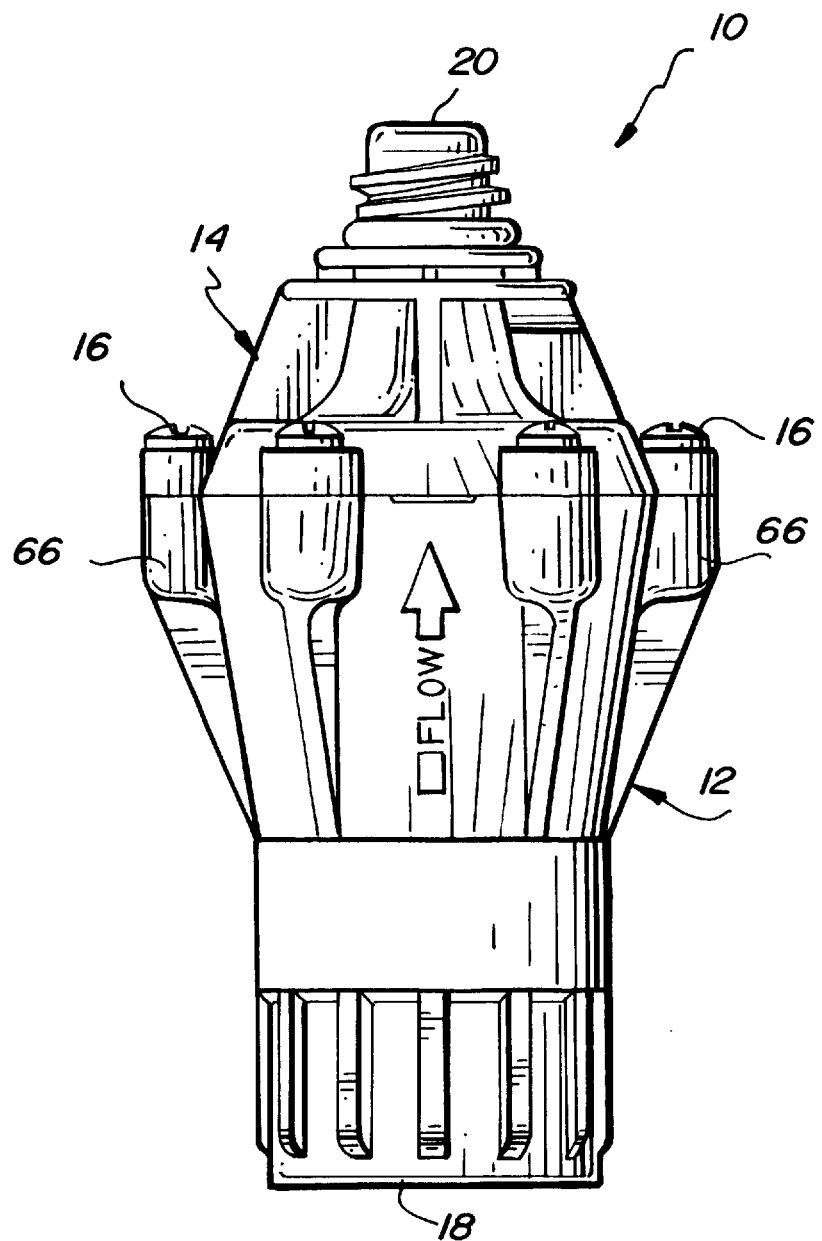
FIG. 1 is a side elevation of a combination pressure regulator/drain check valve in accordance with this invention.
Figure 2:
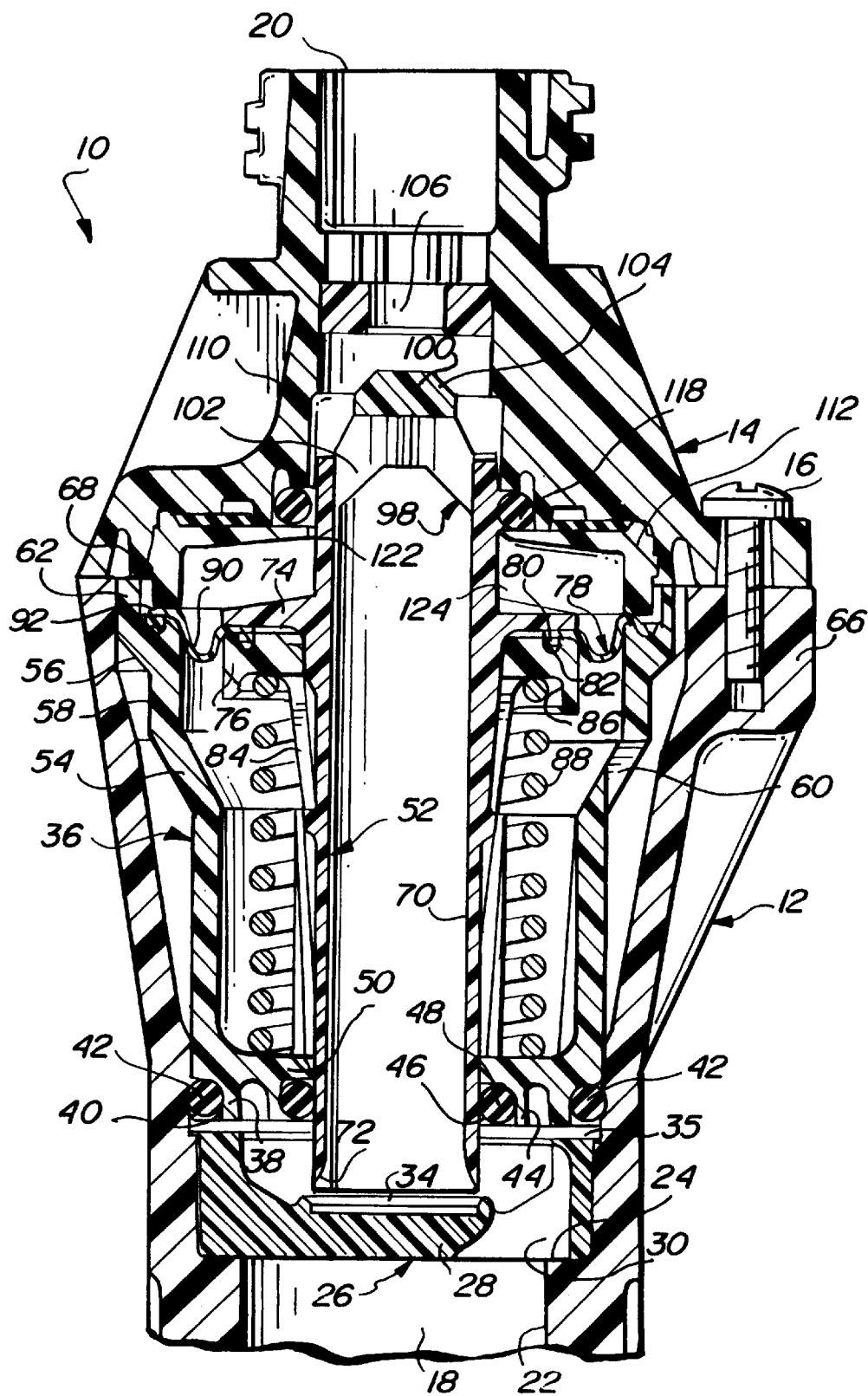
FIG. 2 is a side section of the valve shown in FIG. 1, with an internal valve plunger assembly in position to allow liquid to flow through the valve and, with a different outlet thread.
Figure 3:
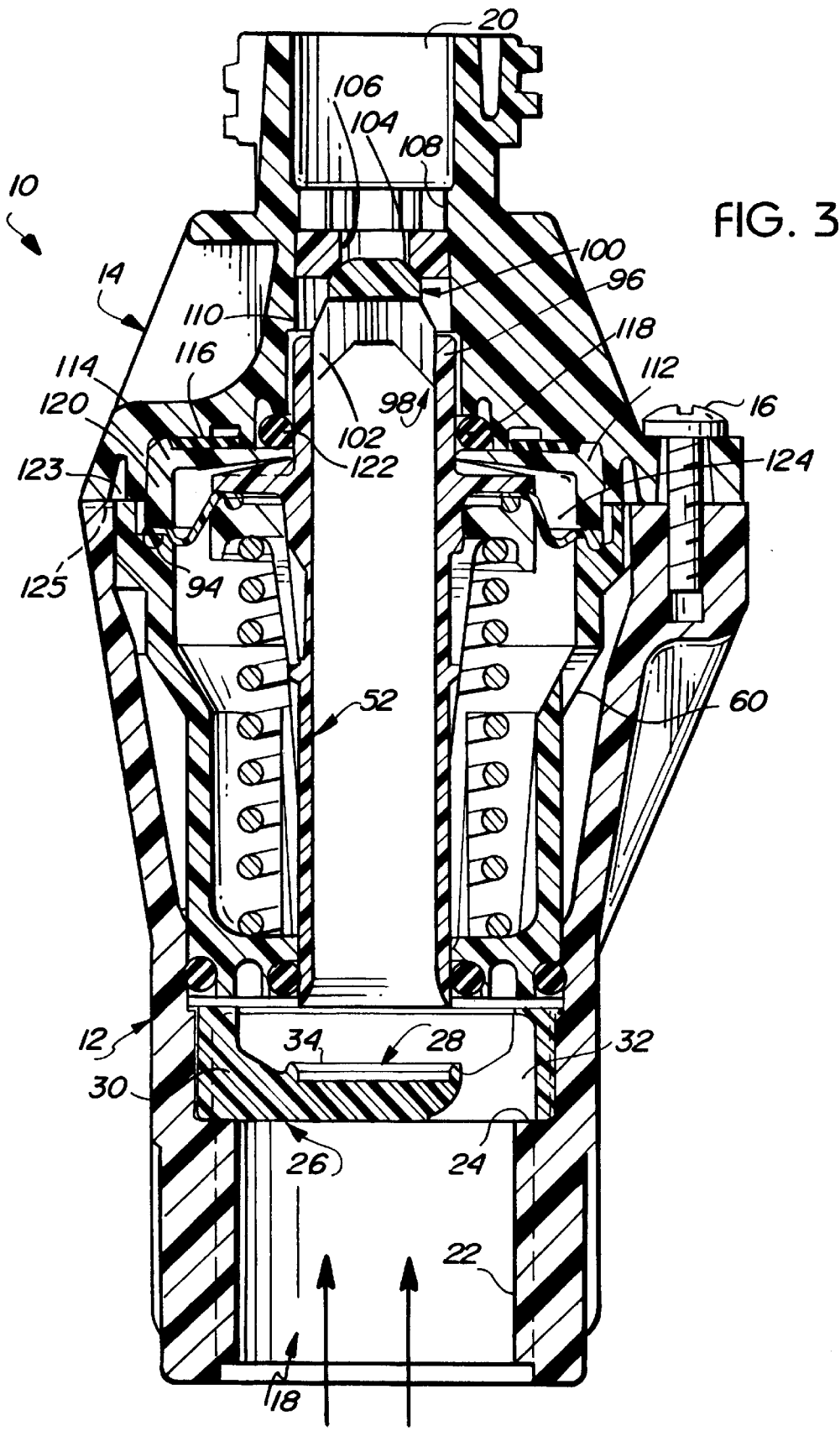
FIG. 3 is a side section similar to FIG. 2 but with the drain check valve in the closed position.

With reference to FIGS. 1–3, a fluid pressure regulator 10 in accordance with an exemplary embodiment of this invention is shown to include a tubular housing having an upstream or inlet section 12 and a downstream or outlet section 14 secured together by means of fasteners such as screws 16. The flow regulator 10 is of the flow-through type, with an inlet 18 provided at one end of upstream housing section 12, and an outlet 20 provided at the distal end of the downstream section 14. The inlet portion 18 of the regulator may be threaded internally or externally in any of a number of thread configurations and sizes to facilitate attachment to variously sized hoses or other conduits. The outlet portion 20 is exteriorly threaded (but could be interiorly threaded), and is adapted to receive in a typical arrangement, a rotary impact type sprinkler, a fixed spray head, or other sprinkler device.

Within the upstream section 12 of the regulator housing, and adjacent the inlet 18, the interior thereof is formed with a threaded inlet bore 22 (for attachment to a source conduit or pipe) extending axially to a radially outwardly extending shoulder 24 which receives a pressure regulator seat 26. The latter includes an annular centrally located seating surface 28 surrounded by a plurality of webs or spokes 30 (preferably, four) with circumferentially oriented flow spaces 32 therebetween. The disk-shaped seating surface 28 is further defined by an upstanding, annular peripheral rib 34. A flat washer 35 is seated atop the seat 26, a central opening therein having a diameter substantially equal to the inside diameter of the rib 34.

Figure 5:
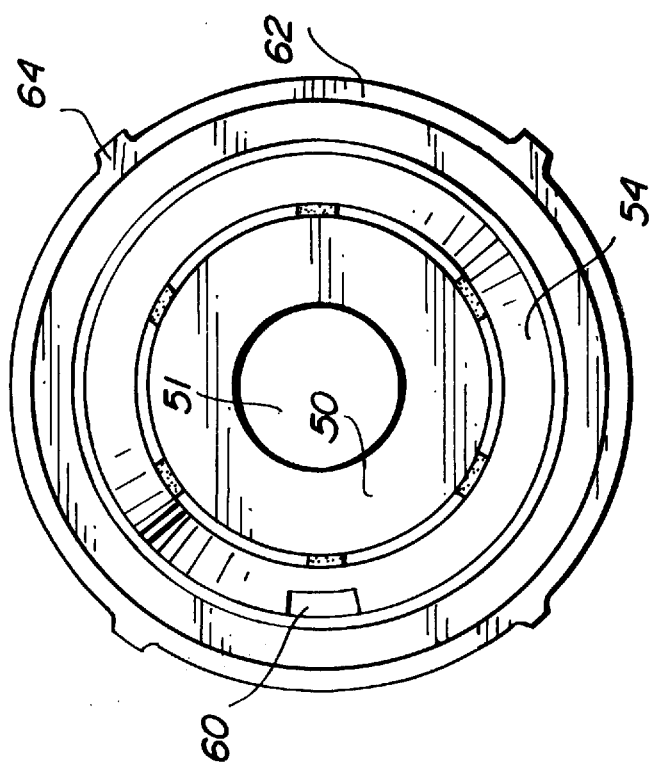
FIG. 5 is a top plan view of an internal sleeve incorporated in the valve shown in FIGS. 1 and 2.

The regulator seat 26 and washer 35 are held securely within the regulator housing by means of a tubular liner or sleeve 36 formed at its lowermost end with an annular ring 38 which is adapted to bear on the washer 35. The ring 38 defines an annular recess 40 which receives a first outer O-ring 42. An inner ring 44 defines a second annular recess 46 which receives a second inner O-ring 48. These O-rings insure that fluid flowing through the regulator 10, in the direction from the inlet 18 to the outlet 20, is constrained to flow through the desired flow path as described below. The rings 38 and 34 extend downwardly from a surface 50 which defines an inner diameter opening 51 (FIG. 5) for the sleeve, and through which a plunger assembly 52 reciprocates as described further below. The sleeve 36 extends upwardly through a radially enlarged portion of housing section 12. The sleeve itself expands radially outwardly at tapered shoulders 54 and 56 connected by cylindrical section 58. A relatively small opening 60 is provided in the annular tapered surface 54, best seen in FIGS. 2 and 5 to provide venting of the spring chamber as described further herein. An upper cylindrical edge portion 62 of the sleeve has a diameter approximating the inner diameter of section 12 at its upper edge. Annularly spaced ribs 64 (FIG. 5) provided on the edge 62 serve to precisely center the sleeve within the housing section 12.

The upper end of section 12 is formed with a plurality of screw receiving bosses 66, spaced annularly about the housing section, by which the upper section 14 is joined by way of the screws 16. An inner annular ring 68 on the upper section 14 engages the upper end of the sleeve 36 so that upon assembly of the downstream section 14 to the upstream section 12, the sleeve 36 and seat 26 are firmly clamped between the ring 68 of the downstream section 14 and the annular shoulder 24 of the upstream section 12.

Figure 4:
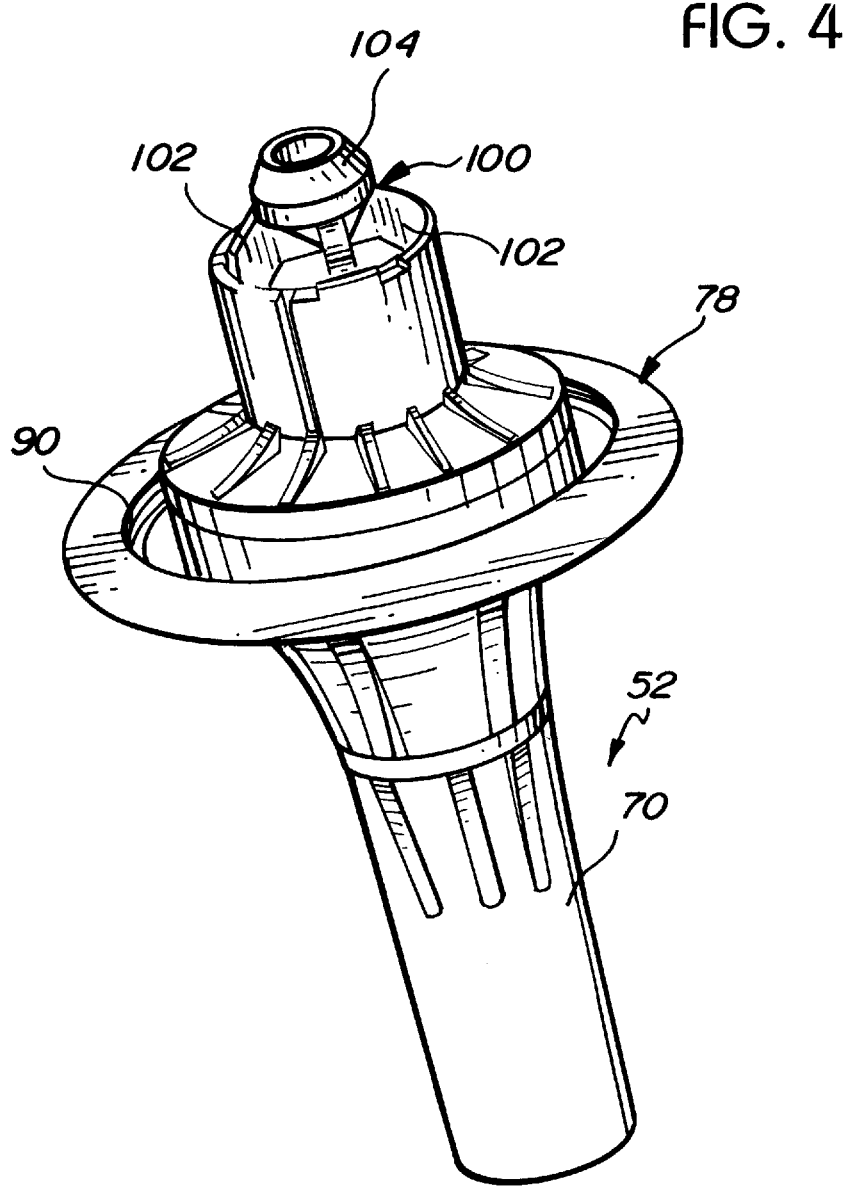
FIG. 4 is a perspective view of the plunger assembly incorporated within the valve shown in FIGS. 1 and 2.
Figure 7:
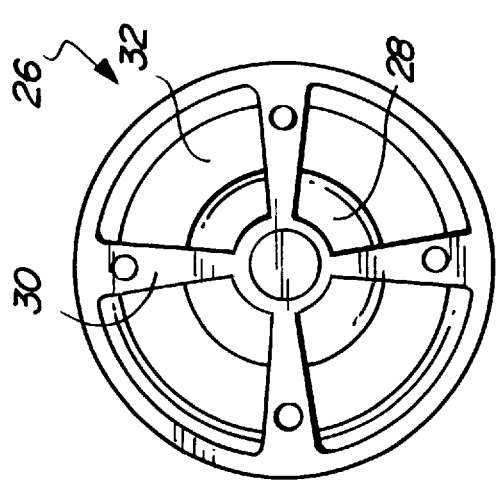
FIG. 7 is a bottom plan view of the pressure regulating valve seat shown in FIG. 6.
Figure 6:
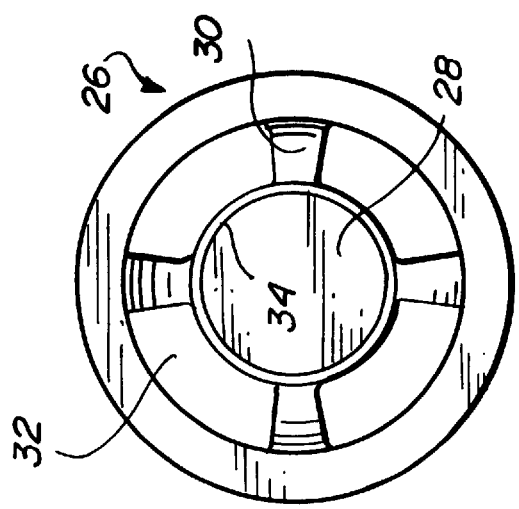
FIG. 6 is a top plan view of a pressure regulating valve seat incorporated in the valve shown in FIGS. 1 and 2.

The plunger assembly 52 (see also FIG. 4) includes a substantially tubular center body 70 with a tapered lower edge at 72 (FIGS. 2 and 3) which fits precisely within the annular rib 34 of the regulator seat 28. Center body 70 is sized to slide within the opening 51, wiping against the inner O-ring 48 as it moves axially in the manner described below. In the upper portion of the plunger assembly, there is a radial flange 74. Below the flange, there is an annular retainer 76. An annular diaphragm 78 is sandwiched between the flange 74 and retainer 76, with an annular rib 80 at the inner diameter of the diaphragm received within an annular groove 82 in the retainer 76. The retainer is located on the center body and held in place by a plurality of integral spring fingers 84. Note that the retainer 76 is formed on its underside with an annular recess 86 adapted to receive and center one end of a coil spring 88 extending between the retainer 76 and the surface 50 of the sleeve 36.

The diaphragm 78 is formed with an annular flex groove or area 90 radially between the inner rib 80 and an outer annular rib 92 which is received in an annular groove 94 at the upper end of the sleeve 36 where it is clamped by the upper housing section 14 as described below.

The tubular center body 70 extends above the radial flange 74, terminating at an upper edge portion 96 in which is seated (or formed integrally) a drain check or poppet valve 98. The poppet includes a valve 100 connected to the upper end of the body 70 via a plurality (preferably four) of webs or spokes 102 (generally similar to the regulator seat 26). The valve 100 includes a tapered annular valve surface 104 adapted to engage an annular upper seat 106 received within the bore 108 of the upper section 14. The latter also includes a radial shoulder 110 adapted to engage the upper edge of the plunger body 70 when the drain check valve is closed (FIG. 3). Seat 106 may be plastic, rubber or other suitable material. A softer elastomer may be employed to insure good sealing.

The upper housing section 14 supports an annular diaphragm retainer 112 having a center opening sized to permit the upper end of the plunger assembly 52 to slide therethrough. The retainer 112 has an upstanding annular rim 114 about its upper edge which surrounds a rubber washer 116. Radially inward of washer 116, the upper section 14 supports an O-ring 118 which seals against the plunger body 70 as the latter moves between open and closed positions. The O-ring 118 is held in place by the retainer 112. The latter is held within the upper section 14 by friction fit. When the upper section 14 is secured to the lower section 12, the outer edge of the diaphragm is clamped between a downwardly projecting skirt 120 of the retainer 112 and the upper end of sleeve 36.

With specific reference to FIGS. 2 and 3, it should be noted here that an axial slot 122 is formed in the upper end of the plunger assembly 52, allowing water exiting the plunger assembly 52 to flow back past the O-ring 1 18 and into the annular chamber 124 on the upper side of the diaphragm 78. The coil spring 88, which biases the plunger to a normally closed position (FIG. 3), is calibrated so that, at some pressure slightly below the operating pressure, the water pressure on the diaphragm 78 moves the plunger assembly 52 downwardly, allowing water to flow through the regulator from inlet 18 toward outlet 20, through openings 32, plunger assembly 52, around the poppet 98 (FIG. 2) and out the outlet 20. Under normal flow, the plunger assembly is not moved so far down that edge 72 seats in the regulator valve 26. In the event of a pressure buildup within the line or device downstream of the outlet 20, water will flow through axial slot 122 past the O-ring 118 and into the annular chamber 124 above the diaphragm 78, to bear on the radial flange 74 and the diaphragm. This causes the plunger assembly 52 to move downwardly or in an upstream direction toward the pressure regulator seat 34. Note that the area below the diaphragm and between the plunger assembly 52 and the sleeve 36 is vented to atmosphere by means of the opening 60 in the sleeve, and spaces between the sleeve 36 and housing section 12 defined by ribs 64 (see FIG. 5), annular groove 123 (FIG. 3) in the lower edge of housing section 14, and annularly spaced radial slots 125 (one shown in phantom in FIG. 3) in the upper edge of housing section 12 so that pressure exerted on the flange 74 and diaphragm 78 must not only overcome the bias of spring 88 but atmospheric pressure as well. Depending upon the amount of back pressure developed within the regulator 10, the plunger assembly 52 may be moved rearwardly (in the downstream direction) to the point that the annular edge 72 engages seat 34, thereby preventing any further flow through the regulator. Upon a subsequent decrease in back pressure, the spring 88, along with atmospheric pressure, will serve to overcome whatever back pressure is present to thereby move the plunger assembly 52 upwardly or in the downstream direction, thereby opening the fluid flow passage between the plunger assembly and the pressure regulator seat 34.

When the water is shut off and the pressure drops, the coil spring 88 will bias the plunger assembly 52 upwardly so that poppet valve surface 104 of the poppet valve 98 will seal on the upper drain check valve seat 106, precluding any drainage out of the regulator/valve.

The drain check valve feature incorporated into the pressure regulator also serves to restrict flow in the case of a broken riser or missing sprinkler downstream of the drain check valve. The plunger assembly 52 would normally move up in response to the drop in pressure due to the downstream break. In a conventional pressure regulator, this would effectively open the regulator wide open, providing no restriction to the flow. In the combination pressure regulator/drain check valve device of this invention, the plunger assembly 52 would continue moving up until the poppet valve 98 moves close enough to the valve seat 106 to restrict the flow enough that sufficient pressure is created in the diaphragm area to stop the upward movement of the plunger assembly. The unit would remain in this state of equilibrium, restricting the flow. Tests have confirmed that the flow may be reduced by as much as 50% under these conditions.

Figure 8:
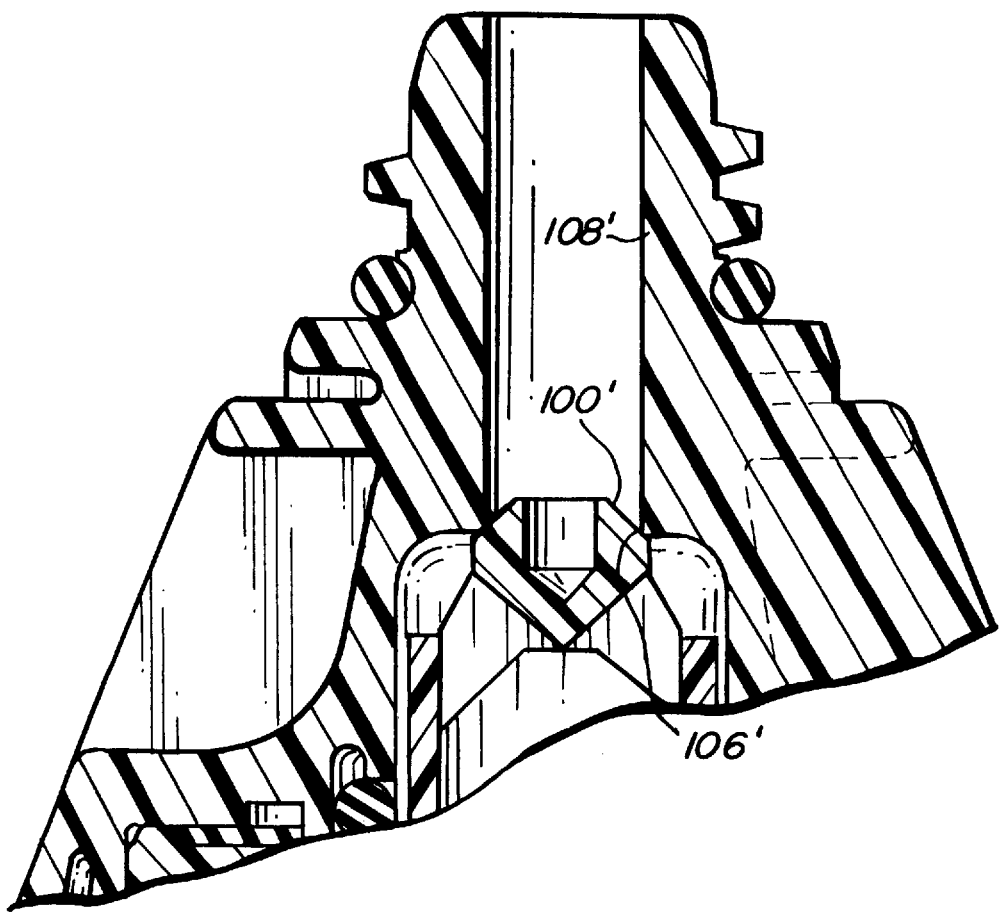
FIG. 8 is a partial side section illustrating an alternative embodiment of the invention.

A variation of the poppet arrangement is illustrated in FIG. 8. In this embodiment, the separate valve seat component 106 (FIGS. 2 and 3) has been omitted. Here, the valve 100' seals directly against annular edge 106' of the bore 108'. Otherwise, the device operates as described above in connection with FIGS. 1–7.

Figure 9:
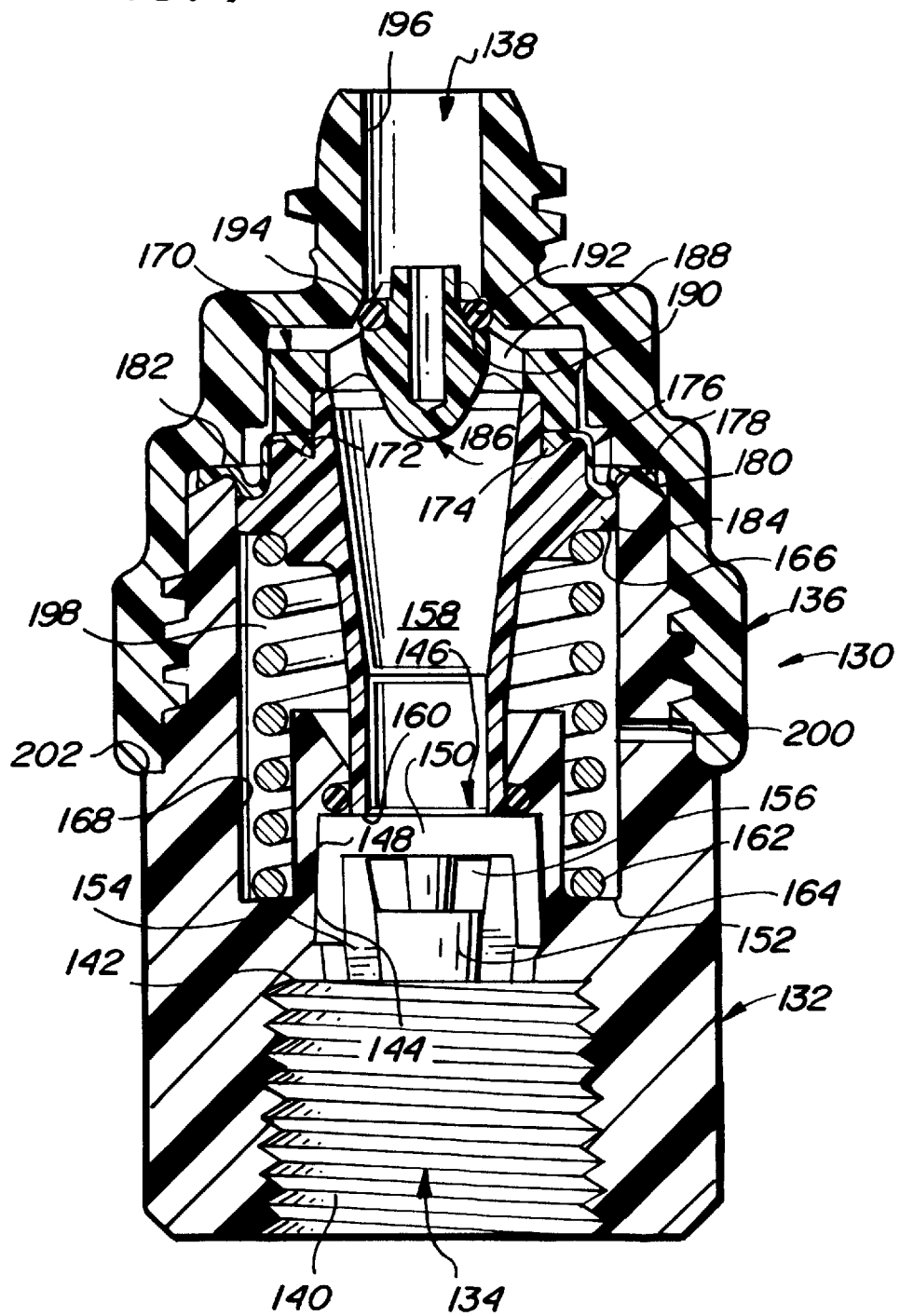
FIG. 9 is a side section of a valve in accordance with another embodiment of the invention.

Turning now to FIG. 9, an alternative arrangement is disclosed which simplifies the construction and reduces the number of parts of the regulator/drain check valve. Here, the tubular housing 130 includes a main body 132 with an inlet 134 at one end thereof, and a cap 136 threadably secured by, e.g., an acme thread, to the main body 132, the cap having an outlet 138.

Within the upstream section adjacent inlet 134, the main body is interiorly threaded at 140 from the entry to a radial shoulder 142. Within a reduced diameter bore section 144, there is located a regulator seat 146 which is snap fit into an annular groove 148 in the bore side wall. The seat has an annular upper ring 150 connected to a lower solid disk 152 by three vertical ribs 154, equally spaced about the circumference of the ring 150 (see also FIGS. 10 and 11). The OD of disk 152 is slightly smaller than the ID of ring 150 and the ring and disk are separated vertically to establish flow paths exteriorly past the disk 152 and through three windows 156 and through the ring 150 and then into the reciprocable plunger 158.

The lower edge 160 of the plunger moves toward the upper surface of the disk 152 when the pressure exceeds the pre-set maximum, overcoming the upward bias of the coil spring 162. The latter extends between the base 164 of an annular recess in the main body 132, surrounding the seat 146 and a radial surface 166 of the plunger 158. The latter moves within the bore 168 in the main body portion 132 in the same manner as described in connection with the first embodiment. A combined drain check valve and diaphragm retainer 170 is seated atop the plunger. An annular wedge-shaped groove is created between the lower, radially outer surface of the retainer 170 and an annular, tapered shoulder 172 on the plunger, adapted to clamp a similarly shaped radially inner end 174 of a diaphragm 176. A similarly shaped (but oppositely oriented) thickened outer peripheral portion 178 of the diaphragm 176 is adapted to be held between an upper inclined edge 180 of the main body 132 and a horizontal shoulder 182 of the cap 136. The flex portion (radially intermediate the thickened inner and outer bands) of the diaphragm is supported on its underside by a radially outermost flange 184 of the plunger 158.

At the center of the retainer 170, there is a drain check valve body 186 connected to the retainer ring by a plurality of radial webs or spokes 188, establishing a flowpath around the outside of the valve body in the direction of flow.

A radial shoulder 190 at the upper end of the valve body 186 supports an O-ring 192 adapted to engage and seal against an annular tapered edge surface 194 at the lower end of an exit bore 196 in the cap 136.

Figure 10:
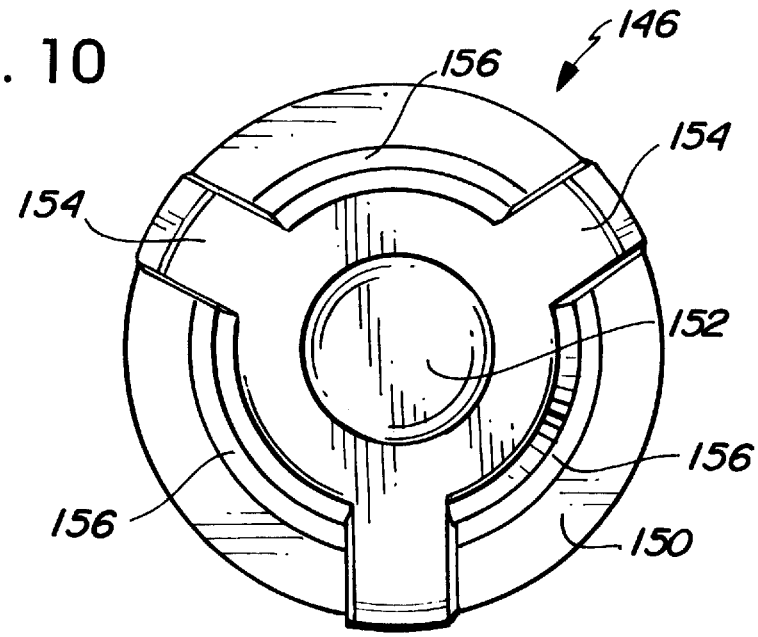
FIG. 10 is a bottom plan view of the pressure regulating valve seat shown in FIG. 9.
Figure 11:
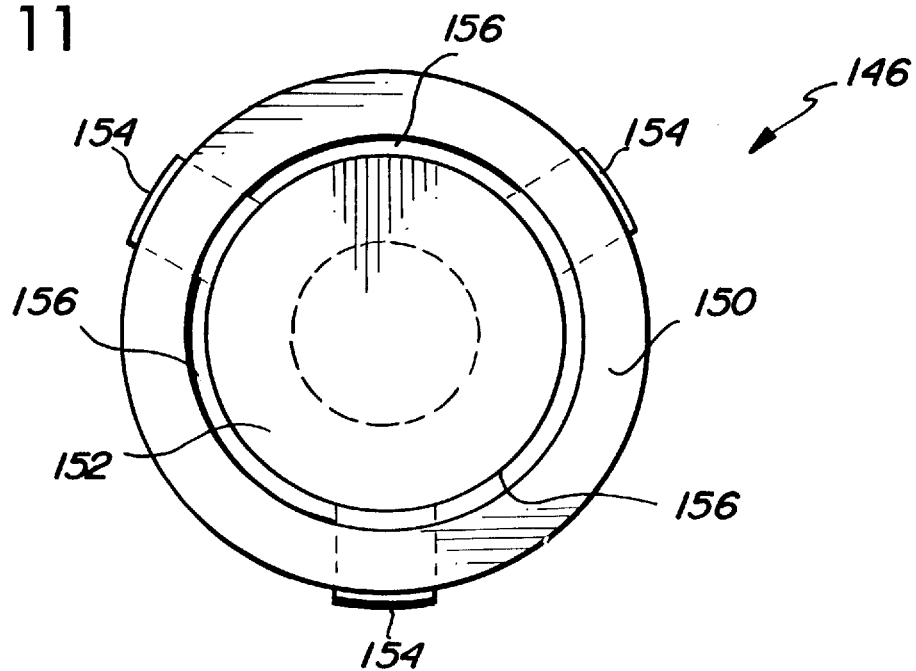
FIG. 11 is top plan view of a pressure regulating valve seat incorporated in the valve shown in FIG. 10.

The pressure regulator/drain check valve shown in FIGS. 9–11 operates in substantially the same manner as the first described embodiment. Note in this regard that the open area 198 below the diaphragm 176 and surrounding the plunger 158 is vented to atmosphere by a lateral bore 200 in the main body 132 which leads to an area at the lower end of the cap 136 and a radial stop shoulder 202 on the exterior of the main body. This area, in turn, is vented to atmosphere by one or more radial grooves 204 in the lower edge of the cap. This offset arrangement between bore 200 and groove(s) 204 prevents dirt or debris from entering the area.

The embodiments described herein effectively combine the features of a pressure regulator and a drain check valve within a single cost effective unit, noting especially that except at very high flow rates the pressure loss through the unit is no greater than that normally experienced in conventional flow regulators that do not include the drain check valve function.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined pressure regulator drain check valve comprising:

a housing having a main body with an inlet at one end thereof, and a cap secured to an opposite end thereof, said cap having an outlet, an axial flowpath extending between said inlet and said outlet;

a pressure regulator seat secured within said main body adjacent said inlet;

a drain check seat formed integrally with the cap adjacent said outlet;

a tubular plunger located within said main body movable toward and away from the pressure regulator seat and the drain check seat; said plunger having a lower open end defined by a cylindrical edge in alignment with said pressure regulator seat; said plunger having an open upper end which supports a drain check valve including a resilient seal adapted to engage said drain check valve seat; said plunger axially aligned with said inlet and outlet to establish a portion of said axial flowpath; said drain check valve connected to an outer annular ring by a plurality of radial webs which permit flow around the drain check valve into the outlet when the valve is open; said outer annular ring fixed to an outer peripheral wall of said plunger for movement therewith; a diaphragm extending radially between said plunger and said main body, with one side of a radial flange on said plunger providing support for a radially inner portion of said diaphragm; and a spring having one end engaging an opposite side of said radial flange, and an opposite end engaging the main body at a location proximate to said pressure regulator seat, said spring normally biasing said plunger and said drain check valve in a direction toward said drain check seat.

2. The valve of claim 1 wherein said inner portion of said diaphragm is sandwiched between said radial flange and said outer annular ring.

3. The valve of claim 2 wherein an outer portion of said diaphragm is sandwiched between said main body and said cap.

4. The valve of claim 1 wherein said diaphragm creates separate isolated chambers on opposite upstream and downstream sides of said diaphragm.

5. The valve of claim 4 wherein said plunger includes an axial groove above said diaphragm permitting liquid to flow into the chamber on the downstream side of the diaphragm and wherein the upstream side of the diaphragm is vented to atmosphere.

6. The valve of claim 1 wherein said spring is calibrated to cause said plunger assembly to move away from said pressure regulator seat under predetermined normal flow conditions and to yield to abnormally high pressure in an opposite direction, thereby causing said plunger assembly to engage said pressure regulator seat.

7. The valve of claim 1 wherein said spring is calibrated to cause said drain check valve to engage said drain check valve seat upon a predetermined decrease in pressure.

8. The valve of claim 1 wherein said pressure regulator seat is removably secured within said housing adjacent said inlet, said seat supporting an annular seal engaged with an outer peripheral surface of said plunger.

* * * * *